United States Patent [19]

Davis

[11] Patent Number: 5,507,942
[45] Date of Patent: Apr. 16, 1996

[54] FUEL FILTER ASSEMBLY

[75] Inventor: Leland L. Davis, San Antonio, Tex.

[73] Assignee: Davco Manufacturing L.L.C., Saline, Mich.

[21] Appl. No.: 199,555

[22] Filed: Feb. 22, 1994

[51] Int. Cl.⁶ .............................. B01D 35/14; F02B 75/12
[52] U.S. Cl. .................... 210/94; 210/198.1; 210/440; 210/442; 210/443; 210/416.4; 123/1 A; 222/189.01
[58] Field of Search .......................... 123/1 A; 222/189; 210/94, 198.1, 440–444, 416.4

[56] References Cited

U.S. PATENT DOCUMENTS

| 2,792,116 | 5/1957 | Lenz et al. ............................ 210/94 |
| 3,237,770 | 3/1966 | Humbert, Jr. .......................... 210/94 |
| 3,239,064 | 3/1966 | White .................................. 210/436 |
| 3,749,247 | 7/1973 | Rohde ................................. 210/205 |
| 4,075,097 | 2/1978 | Paul .................................... 210/168 |
| 4,144,169 | 3/1979 | Grueschow ........................... 210/199 |
| 4,271,015 | 6/1981 | Moore ................................. 210/94 |
| 4,429,665 | 2/1984 | Brown ................................. 123/1 A |
| 4,522,712 | 6/1985 | Fischer et al. ...................... 210/416.4 |
| 4,540,489 | 9/1985 | Barnard ............................... 210/287 |
| 4,544,387 | 10/1985 | Agerlid ............................... 55/274 |
| 4,617,116 | 10/1986 | Seiler ................................. 210/137 |
| 4,621,593 | 11/1986 | Rao et al. ............................ 123/1 A |
| 4,751,901 | 6/1988 | Moor .................................. 123/196 A |
| 4,755,289 | 7/1988 | Villani ................................ 210/132 |
| 4,759,842 | 7/1988 | Frees .................................. 210/94 |
| 4,981,584 | 1/1991 | Nunes ................................. 210/416.4 |
| 4,997,555 | 3/1991 | Church et al. ...................... 210/416.4 |
| 5,059,217 | 10/1991 | Arroyo et al. ...................... 123/1 A |
| 5,092,303 | 3/1992 | Brown ............................... 123/1 A |

FOREIGN PATENT DOCUMENTS

| 8600242 | 1/1986 | WIPO ................................. 210/416.4 |
| 9301874 | 2/1993 | WIPO ................................. 210/416.4 |

Primary Examiner—Erick R. Solis
Attorney, Agent, or Firm—Basile and Hanlon

[57] ABSTRACT

A fuel filter assembly that provides a constant level of least restricted fuel flow through the fuel filter assembly during the useful life of the filter media by utilizing the least possible amount of filter media to provide the least possible pressure differential over the filter media while also providing a constant level of fuel additive by exposing an amount proportional to the filter media required for the least possible restricted fuel flow. The fuel filter assembly utilizes a vertically upward housing that houses a filter media and a fuel additive. The fuel level slowly rises in the housing as the filter media becomes obstructed with contaminants and as the fuel additive dissolves over the life of the filter media. The top portion of the housing is made of a transparent material so that the level of fuel level may be easily determined, thereby allowing for an accurate and simple assessment of the useful life of the filter media and the fuel additive. The housing also provides a multi-purpose aperture provided in the top of the housing to provide for removal and/or replacement of the fuel additive and venting and priming of the housing. The filter media and fuel additive are entirely fabricated from combustible materials so that both may be easily discarded without cost and environmental concerns.

20 Claims, 2 Drawing Sheets

FUEL FILTER ASSEMBLY

FIELD OF THE INVENTION

The present invention relates to fuel filter assemblies and more particularly, to a fuel filter assembly that provides a constant level of restricted fuel flow through the fuel filter assembly during the useful life of the filter media by utilizing a minimum amount of filter media to obtain the least possible restricted fuel flow while providing a fuel additive whose addition is proportionally related to the amount of filter media required for least possible restricted fuel flow.

BACKGROUND OF THE INVENTION

It is well known to utilize fuel filter assemblies to filter fuel for a combustible engine of a motor vehicle. Such fuel filter assemblies typically comprise a sideways or downwardly mounted canister having a paper filter media enclosed in the canister. The fuel enters and fills the canister so that all of the filter media is doused with fuel as the fuel passes through the paper filter media and exits the canister to travel to the engine. Various contaminants are filtered from the fuel that would degrade the performance of the engine if left within the fuel. After a certain amount of filtration, the contaminants begin to obstruct the filter media and restrict fuel flow through the filter media. Since the entire filter media is doused in fuel, fuel flow restriction steadily increases during the useful life of the filter media. Restricted fuel flow degrades the performance of the engine, and if unattended, could lead to continued degradation of performance as well as mechanical and structural failure of the engine's components.

As fuel flows through the filter media, a pressure differential occurs across the filter media as the unfiltered side of the filter media realizes a higher pressure from the fuel than does the filtered side. When the filter media is unobstructed, the pressure differential is at a minimum since fuel is relatively free to flow through the unobstructed filter media. When the filter media becomes obstructed, the pressure differential increases as pressure increases on the unfiltered side of the filter media to force the fuel through the obstructed filter media. This can lead to contaminants being forced through the filter media, essentially, tearing the filter media. Typically, when the useful life of the filter media has expired, the filter media is replaced, although no method or apparatus is provided that accurately determines when the filter media should be replaced. It is well known to provide transparent canisters to view the condition of the filter media, but there is still no indication as to how obstructed the filter media is or to what extent fuel flow is being restricted.

With the advent of electronically controlled fuel injection engine systems, fuel filter systems are playing an ever increasingly important role in reducing and eliminating contaminants in fuel. Such fuel injection systems utilize extremely high injection pressures and, therefore, are extremely sensitive to restrictive fuel flows and various contaminants.

There are many known contaminants which will effect the performance of a fuel injection system. Due to the high injection pressures of fuel injection systems, minute quantities of water damage injectors by destroying internal lubrication and by causing galling and erosion of spray holes and tips. Also, such fuel injector systems now expose fuel to repeated heating and cooling cycles as fuel flows through cylinder heads and around fuel injectors of engines. This creates water condensation in fuel tanks as well as microbial growths and polymerization of fuel components. All of these contaminants contribute to a shortened fuel filter life as the contaminants begin to obstruct the filter media and restrict fuel flow.

As mentioned earlier, the problem of an obstructed fuel filter is typically remedied by replacing the filter media, but since the contamination formation rate in the fuel varies with temperatures, crude stocks and time, it is not easy to determine the status of serviceability or the remaining useful life of a conventional fuel filter. As the demand on fuel filter systems to filter such a wide range of contaminants increases, the price of such fuel filters increase, and therefore, it is not desirable to prematurely replace a fuel filter. A high rate of fuel filter replacement creates problems with fuel filter disposal, disposition cost of used filters, and environmental considerations. Also, when servicing fuel filter assemblies, concern must be given to fuel that is still within the fuel filter assembly after venting the assembly so that such fuel does not escape into the environment or be allowed to exit into the fuel outlet without having been filtered and treated.

As previously described, the heating and cooling cycles of fuel involved in fuel injector systems may promote the growth of microorganisms such as bacteria and fungi. Such microorganisms create problems of sludge, clogged fuel filters and corrosive by-products that damage storage tanks, fuel lines, filters, injection pumps, injectors, burners, governors and other control mechanisms. Microorganisms deplete special additives for gasoline, gasohols and alternative fuels needed for octane and cetane improvement as well as depleting other chemicals that improve performance or comply with environmental and clean air requirements.

It is well known to douse fuel tanks or bulk storage tank reservoirs with fuel additives when microorganic infections are found. Generally, once the microorganisms are found, a great amount of damage and contamination has occurred resulting in expensive maintenance, replacement of components and filters as well as the stoppage of furnaces and engines. Several attempts have been made to provide a fuel filter that not only filters fuel but also provides a fuel additive for destroying microorganisms in the fuel. Such fuel additives are typically released manually and have no means by which to slowly release the fuel additive or release the fuel additive when microorganisms have reached an unacceptable level. Also, none of these attempts provide a method or means by which to replace the fuel additive or accurately gage the need to replace the fuel additive.

It would be desirable to provide a fuel filter assembly that provided a constant level of restricted fuel flow through the fuel filter assembly during the useful life of the filter media by utilizing a minimum amount of filter media to obtain the least possible restricted fuel flow while also providing a fuel additive whose addition is proportionally related to the amount of filter media required to provide the lowest possible level of restricted fuel flow. It would also be desirable to provide a fuel filter system that provided an accurate and simple means by which to gage the useful life of the filter media and the fuel additive. In addition, it would be desirable to provide a multipurpose access means for easily removing and/or replacing the fuel additive, for venting the fuel filter assembly, and for priming the fuel filter assembly without disassembling the fuel filter assembly. It would also be desirable to provide a means for collecting excess fuel upon venting and draining the fuel from the fuel filter so that fuel does not escape the fuel filter housing or exit unfiltered and untreated into the fuel outlet. Lastly, it would also be desirable to provide a fuel filter media and fuel additive that could be discarded without having cost and environmental concerns.

SUMMARY OF THE INVENTION

The present invention provides a fuel filter assembly that provides a constant level of restricted fuel flow through a filter media during the useful life of the filter media by utilizing a minimum amount of filter media to obtain the least possible restricted fuel flow while providing a fuel additive whose addition is proportionally related to the amount of filter media required for the least possible restricted fuel flow. The present invention also provides a means by which to accurately assess the useful life of the filter media and fuel additive so that proper and efficient replacement of the filter media and fuel additive will occur. In addition, the present invention provides a multi-purpose access for removing and/or replacing the fuel additive without the need for disassembling the fuel filter assembly, for providing a means for venting the fuel filter assembly to drain the fuel from the fuel filter assembly, and for providing access to prime the fuel filter assembly directly with fuel. A well is provided in the fuel filter assembly for collecting excess fuel when the fuel filter assembly is vented so that fuel does not escape into the environment or into the engine unfiltered and untreated. Replacement parts for the fuel filter assembly are entirely combustible so that the replacement portions of the fuel filter assembly can be discarded at a minimal expense and concern.

In the preferred form, the present invention provides a vertically upright fuel filter assembly having an enclosed housing. A fuel filter canister is formed by folding a hydrophobic filter media back and forth in a circular direction to form a hollow cylinder housed within the housing. Two end caps support the filter media at each of its ends. A fuel additive is formed into a hollow cylindrical geometry, and a wax substrate is mixed with the fuel additive to support the fuel additive in a vertical orientation and to slowly release the fuel additive upon the wax substrate dissolving. A means for supporting the fuel additive is provided to retain the fuel additive in a stationary vertical position when the bottom portion of the fuel additive begins to dissolve. The fuel additive is housed within the hollow cylinder of the fuel filter canister. The housing has a bottom portion that provides a fuel inlet and a fuel outlet for the entrance and exit, respectively, of fuel.

As fuel enters the housing through the inlet, the fuel level rests when the fuel flow demand is met by utilizing the lowest possible pressure differential across the filter media while utilizing the least amount of filter media to obtain the least possible restricted fuel flow. This results in the fuel level resting at a level where there is enough unobstructed filter media to provide the least possible restriction to fuel flow.

The fuel additive is fuel soluble and slowly dissolves into the fuel, destroying microorganisms that may exist. Upon the filter media becoming obstructed with contaminants, the fuel level rises searching for the least possible restricted fuel flow or the lowest possible pressure differential across the filter media while utilizing the least possible amount of filter media. When the fuel level rises, it also contacts a higher level on the fuel additive. Since the portion of the fuel additive submerged in fuel is constantly dissolving into the fuel, the rising level of the fuel dissolves additional fuel additive to replace the fuel additive that has already dissolved. This provides a substantially constant level of fuel additive in the fuel over the life of the filter media as the remainder of fuel additive is proportional to the remainder of the unobstructed filter media. If the level of microorganisms grow, the filter media will become increasingly obstructed, the fuel level will rise toward the unobstructed filter media, and more fuel additive will dissolve into the fuel to destroy the growing microorganisms. When the fuel level reaches the top of the housing, the filter media is entirely obstructed, and the fuel additive is completely dissolved. The housing of the fuel filter assembly is fabricated from a transparent material to allow the useful life of the filter media and fuel additive to be accurately and easily determined by simply determining the fuel level in the housing.

In another form of the invention, the fuel filter canister comprises the filter media, end caps, wax substrate, fuel additive and means for supporting the fuel additive. All of these elements are fabricated from combustible materials to provide for replacement and discardment of these parts without excessive cost or environmental concerns.

In yet another form of the invention, the top of the housing has a multi-purpose aperture with a mating cap for releasingly and sealingly closing the aperture. When the cap is secured to the housing, the aperture is closed, and the fuel filter assembly is ready for use. When the cap is detached from the housing, and the aperture is open, the fuel additive may be removed and/or replaced with a new fuel additive without the need for disassembling the fuel filter assembly. The aperture may also be opened to vent the housing of the fuel filter assembly and allow the fuel to drain from the housing to conduct maintenance on the vehicle or the fuel filter assembly. The aperture may also be utilized to prime the fuel filter assembly by directly introducing fuel into the housing of the fuel filter assembly via the aperture.

In an additional form of the invention, the housing of the fuel filter assembly comprises a top portion and a bottom portion that are detachably and sealingly connected. The bottom portion provides a well for collecting and holding excess fuel that has drained from venting the housing. After the fuel has drained from the housing, the top portion may be detached from the bottom portion without spilling fuel into the surrounding environment and without having unfiltered and untreated fuel escape into the outlet of the fuel filter assembly and travel to the engine.

To this end, the objects of the present invention are to provide a new and improved fuel filter assembly that provides a constant level of least restricted fuel flow during the useful life of the filter media by utilizing the least possible amount of filter media to obtain the least possible restricted fuel flow while providing a fuel additive whose addition is proportionally related to the amount of filter media required for least possible restricted fuel flow; to provide a new and improved fuel filter assembly that fabricates all replaceable parts of the fuel filter assembly from combustible material so that the replaceable parts may be discarded without cost and environmental concerns; to provide a new and improved fuel filter system that provides a multi-purpose access for removing and/or replacing the fuel additive, for venting the housing of the fuel filter assembly, and for priming the fuel filter assembly by introducing fuel directly into the housing of the fuel filter assembly without having to disassemble the fuel filter assembly; to provide a new and improved fuel filter assembly that provides a well for collecting and holding excess fuel from the housing of said fuel filter assembly upon the housing being vented so that said excess fuel does not escape into the surrounding environment or escape into the fuel outlet before the fuel is filtered and treated; and to provide a new and improved fuel filter assembly that provides an accurate and simple means by which to determine the remaining useful life of the filter media and fuel additive without having to disassemble the fuel filter assembly.

Other objects, advantages and applications of the present invention will become apparent to those skilled in the art when the following description of the best mode contemplated for practicing the invention is read in conjunction with the accompanying drawings.

BRIEF DESCRIPTION OF THE DRAWINGS

The description herein makes reference to the accompanying drawings wherein like reference numerals refer to like parts throughout the several views, and wherein.

DESCRIPTION OF THE PREFERRED EMBODIMENT

Figure 1:
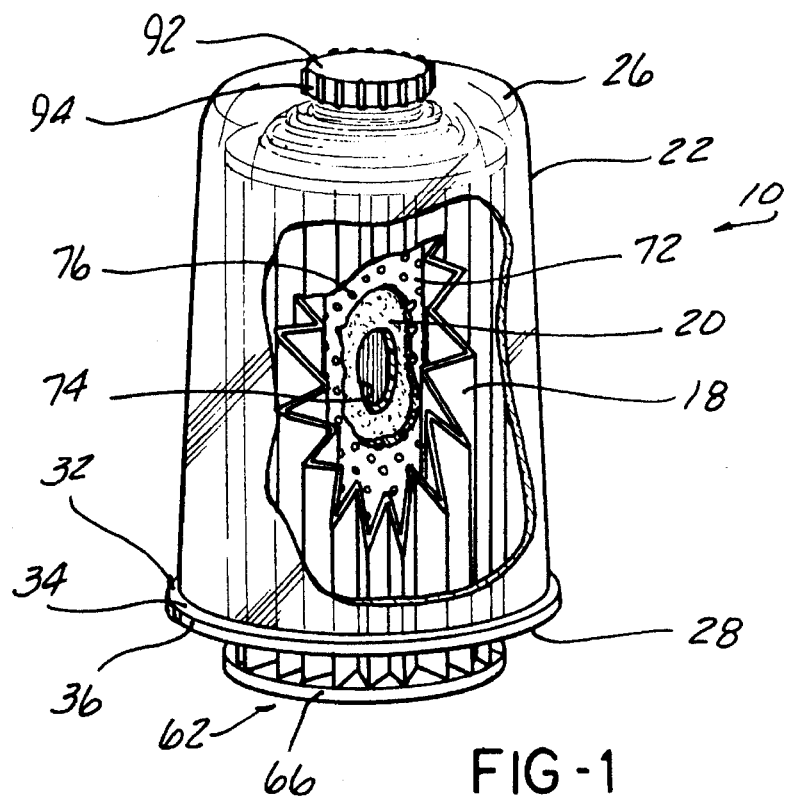
FIG. 1 is a perspective view with some parts cut-away showing the filter media and the fuel additive housed within a transparent top portion of the fuel filter assembly.

Referring to the drawings, the present invention will now be described in detail with reference to the preferred embodiment.

Figure 2:
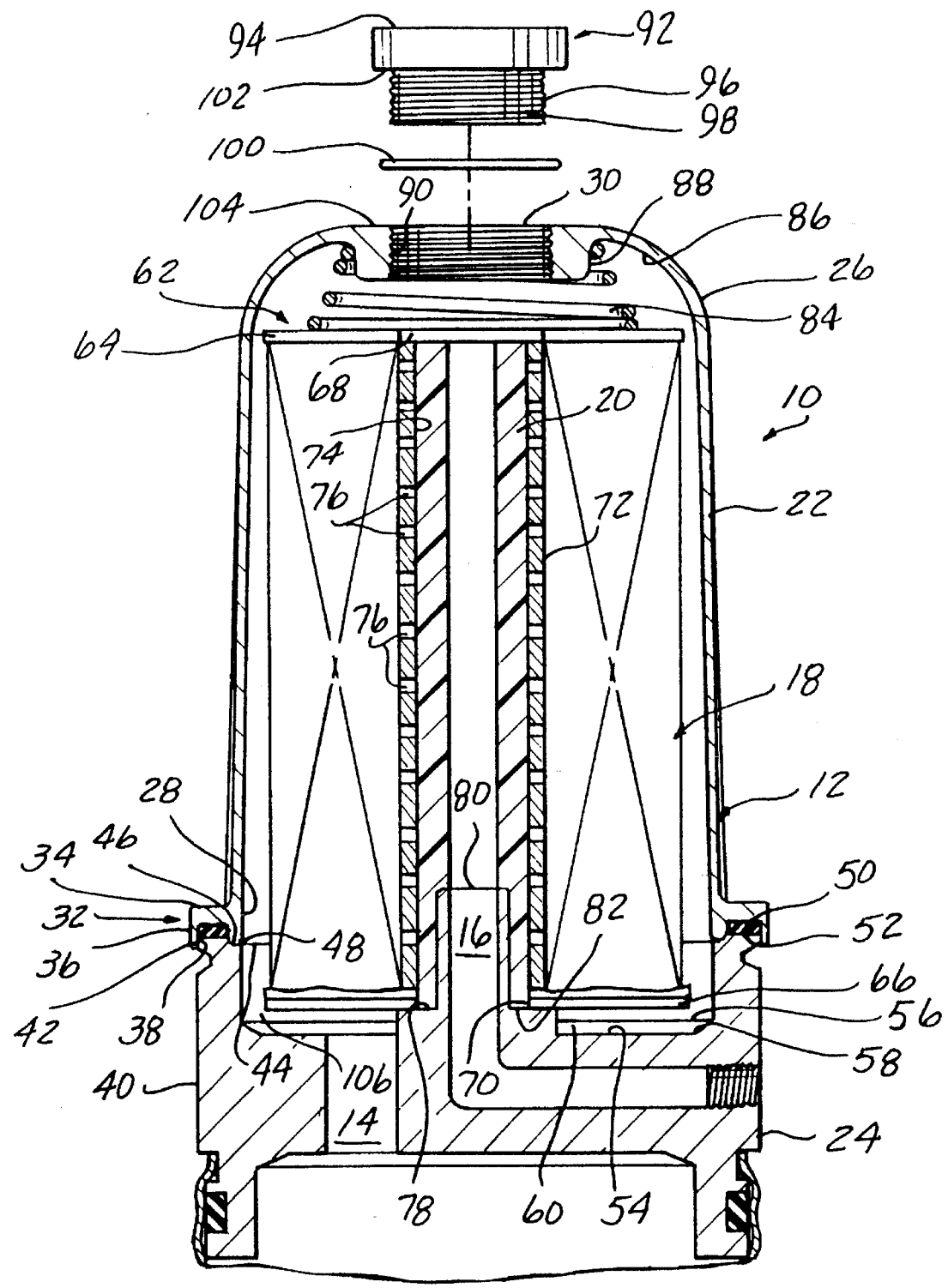
FIG. 2 is an enlarged section view of the fuel filter assembly with some parts exploded showing the top portion and the bottom portion of the fuel filter assembly and showing the filter media and the fuel additive housed within the fuel filter assembly.

FIGS. 1 and 2 show the fuel filter assembly 10 in its preferred form. The fuel filter assembly 10 is mounted vertically upright and provides a closed housing 12 having a fuel inlet 14 that is in communication with a fuel storage tank (not shown) and a fuel outlet 16 that is in communication with an engine (not shown) of a motor vehicle (not shown). A filter media 18 is housed within the housing 12, and a fuel additive 20 is contained within the filter media 18. The fuel inlet 14 delivers fuel (not shown) into the housing 12 so that the fuel passes through the filter media 18 and contacts the fuel additive 20. The fuel additive 20 is soluble in fuel and dissolves in the fuel. The filtered and treated fuel exits through the fuel outlet 16 and flows to the engine.

To allow for maintenance of the fuel filter assembly 10, a simple means for disassembling and reassembling the fuel filter assembly 10 is provided. As seen in FIG. 2, the housing 12 of the fuel filter assembly 10 comprises a top portion 22 and a bottom portion 24. The top portion 22 is substantially cylindrical with a substantially u-shaped cross section. The top portion 22 has a closed end 26 and an open end 28 with an aperture 30 extending through the closed end 26. The open end 28 of the top portion 22 has an L-shaped flange 32 extending outward from the open end 28 of the top portion 22, as seen in FIGS. 1 and 2. The horizontal portion 34 of the L-shaped flange 32 is integral with and substantially perpendicular to the top portion 22 of the housing 12. The vertical portion 36 of the L-shaped flange 32 is integral with and extends downward from the horizontal portion 34. The vertical portion 36 of the L-shaped flange 32 has an inner diameter that provides an interior threaded region 38.

As seen in FIG. 2, the bottom portion 24 of the housing 12 is also cylindrical and has a circumferential wall 40 that is integral with and extends upward from the bottom portion 24. The outside diameter of the wall 40 has a threaded region 42 that mates with the interior threaded region 38 of the L-shaped flange 32 provided on the top portion 22 of the housing 12. The horizontal portion 34 of the L-shaped flange 32 has a bottom surface 44 that abuts a top surface 46 of the wall 40 of the bottom portion 24 when the top portion 22 is threaded onto the bottom portion 24. A parting line 48 is formed between the bottom surface 44 of the L-shaped flange 32 and the top surface 46 of the wall 40. The bottom surface 44 of the horizontal portion 34 of the L-shaped flange 32 provides an annular groove 50 for housing an annular deformable seal 52. The deformable seal 52 is seated in the groove 50 and extends outward from the groove 50. The deformable annular seal 52 deforms against the top surface 46 of the upwardly extending wall 40 of the bottom portion 24 so that the parting line 48 created between the abutting surfaces 44, 46 of the top portion 22 and the bottom portion 24, respectively, is sealed to prevent any fuel from leaking through the parting line 48. The threading and sealing engagement of the top portion 22 and the bottom portion 24 allows the housing 12 to be releasingly and sealingly closed for the filtering and treating of fuel.

To provide for a non-turbulent, even flow of fuel into the housing 12, the bottom portion 24 of the housing 12 has a substantially flat floor 54 with the wall 40 rising vertically from and extending circumferentially around the floor 54. The fuel inlet 14 rises vertically through the bottom portion 24 and through the floor 54 to deliver fuel to the housing 12. A substantially flat subfloor 56 with a plurality of apertures (not shown) therethrough lies slightly above and substantially parallel to the floor 54 of the bottom portion 24. The subfloor 56 is supported by circumferentially chamfered corners 58 of the floor 54. A reservoir 60 is created between the subfloor 56 and the floor 54 for incoming fuel supplied by the fuel inlet 14. Fuel fills the reservoir 60 and provides a fuel level that rises and flows evenly into the housing 12 through the apertures provided in the subfloor 56.

In order to provide a constant level of least possible fuel flow restriction through the fuel filter assembly 10 over the life of the filter media 18 while utilizing the least possible amount of filter media 18, the filter media 18 is housed vertically in the housing 12 so that the lower portions of the filter media 18 become obstructed first before the fuel level rises and utilizes unobstructed upper portions of the filter media 18. A filter canister 62 provides the filter media 18 which is folded back and forth in a circular fashion so that a hollow cylinder is formed. In another embodiment, the filter media 18 may be continually rolled or wound about a vertical axis or reference cylinder to form a hollow cylinder (not shown) having substantially concentric layers of filter media 18 layered adjacent one another. Two end caps 64, 66 support the filter media 18 at its ends, and each end cap 64, 66 has an aperture 68, 70, respectively, extending therethrough that are in common alignment with the hollow cylinder of the filter media 18. The filter media 18 is fabricated from a paper based material, but any other suitable material, such as fiberglass, plastics, etc., may be utilized to provide the proper filtering characteristics while also being combustible for efficient disposal. In another embodiment, the filter media 18 comprises a hydrophobic filter media that prohibits the passage of water through the filter media 18. This prevents any water from passing through the fuel filter assembly 10 and effecting the performance of the engine or damaging fuel injection mechanisms of the engine.

In order to provide a substantially constant level of fuel additive whose addition is proportionally related to the amount of filter media 18 required for the least possible restricted fuel flow, the fuel additive 20 extends vertically upward within the filter canister 62, as seen in FIGS. 1 and 2. The fuel additive 20 is formed into a hollow cylinder by encapsulating or mixing the fuel additive 20 with a wax substrate to provide the proper release of the fuel additive 20 into the fuel. The wax substrate is formulated from a high purity, high melting point paraffin that provides clean burning characteristics without adversely compromising the performance or wear characteristics of the engine. A means for supporting the fuel additive 20 retains the undissolved portion of the fuel additive 20 in its vertical position when the bottom of the fuel additive 20 dissolves.

As seen in FIG. 1 and 2, the means for supporting the fuel additive 20 may be an outer reinforcement 72 that is adhered to the outside surface 74 of the fuel additive 20. The outer reinforcement 72 has a plurality of apertures 76 extending therethrough to allow the fuel additive 20 to be directly exposed to the fuel. The outer reinforcement 72 may be made of a paper based material or a molded plastisol/epoxy that does not dissolve in fuel yet is combustible for efficient disposal. In another embodiment, the supporting means may have an inner skeleton (not shown) fabricated from a thin wire. In an additional embodiment, spring or tension clips (not shown) may be utilized as the supporting means to retain the ends of the fuel additive to the fuel filter canister 62. In yet another embodiment, the supporting means may have a modified inner core support (not shown) that would contain the fuel additive in a liquid or solid phase. The inner core support utilizes separate compartments or levels so that each compartment or level would dissolve individually as the fuel level continued to rise.

The fuel additive 20 is housed within the filter canister 62 so that the fuel is exposed to the fuel additive 20 after passing through the filter media 18. As seen in FIG. 2, the fuel outlet 16 provides a hollow cylinder rising vertically upward through the bottom portion 24 of the housing 12 to a vertical level above the wall 40 of the bottom portion 24. An opening 80 is provided in the top end of the hollow cylinder of the fuel outlet 16 to allow the fuel to travel to the engine. In another embodiment, the top end of the fuel outlet 16 is closed, and a plurality of apertures (not shown) extend laterally through the hollow cylinder of the fuel outlet 16 at a level above the wall 40 of the bottom portion 24. A shoulder 78 is provided on the fuel outlet 16 that extends horizontally outward from the hollow cylinder of the fuel outlet 16. The shoulder 78 rises to a vertical level higher than the subfloor 56 of the bottom portion 24 and lower than the opening 80 of the fuel outlet 16. The bottom portion of the fuel additive 20 telescopically slides over the fuel outlet 16, and a bottom surface 82 of the fuel additive 20 abuts the shoulder 78 of the fuel outlet 16. The filter canister 62 also has its bottom end cap 66 abutting a portion of the shoulder 78 of the fuel outlet 16 so that the filter canister 62 does not cover the apertures in the subfloor 56 and restrict the flow of fuel coming through the fuel inlet 14. By having the fuel outlet 16 within and directly under the fuel additive 20, the fuel is ensured of being filtered and treated before exiting the fuel filter assembly 10.

To prohibit movement of the filter canister 62 within the housing 12, an axial compression spring 84 is seated between the top end cap 64 of the filter canister 62 and the inside surface 86 of the closed end 26 of the top portion 22 of the housing 12. The spring 84 applies a compressive force downward on the top end cap 64 of the filter canister 62 so that the filter canister 62 remains securely seated on the shoulder 78 of the fuel outlet 16 thereby prohibiting movement of the filter canister 62.

In a preferred form, the fuel additive 20 comprises a microbiocide that is compatible with combustion systems and fuels and which is more soluble in fuel than water. Microbiocides that are more soluble in water than in fuel run the risk of having a significant quantity of water exist in the fuel or storage tanks and having these microbiocides partition in the water and adversely effect the pH levels which may cause damage to fuel tanks or fuel components. A microbicide, like the one sold under the trademark "Procide" by Davco Manufacturing Corporation, is only slightly soluble in water and will not adversely effect pH levels. As previously described, such a microbicide is encapsulated in the wax substrate, paraffin, which has a high melting point and a clean burning characteristic and will assure proper release of the microbicide or the fuel additive 20 without compromising exhaust gas emissions and without unduly releasing an excessive amount of fuel additive 20 that may adversely effect engine and fuel components. It should be noted that the present invention is not limited to the fuel additive 20 being a microbiocide, but rather, the fuel additive 20 may also comprise cetane improvers, antioxidants, stabilizers, combustion improvers and emission reducers depending on the objectives and application of the fuel filter system 10.

In order to gain access to the housing 12 without having to disassemble the fuel filter assembly 10, a multi-purpose aperture 30 is provided in the closed end 26 of the top portion 22 of the housing 12. A flange 88 integral with and extending downward from the closed end 26 of the top portion 22 has a threaded region 90 on an inside surface of the flange 88 that defines the aperture 30. A cap 92 having a cylindrical head 94 and a neck portion 96 integral therewith provides a threaded region 98 on an outside surface of the neck portion 96. The threaded region 98 of the neck portion 96 threadingly mates with the threaded region 90 of the flange 88 of the closed end 26 of the top portion 22 to secure the cap 92 to the top portion 22 and to close the aperture 30. A deformable annular seal 100 is provided between a bottom surface 102 of the head 94 of the cap 92 and an outside surface 104 of the closed end 26 of the top portion 22, so that when the cap 92 is secured to the top portion 22, the adjoining surfaces 102, 104, of the cap 92 and top portion 22, respectively, seal to prevent any fuel from leaking through the aperture 30.

To remove and/or replace the fuel additive 20 with a different type of fuel additive or a fully undissolved fuel additive should there be a sudden increase in the growth of microorganisms, the aperture 30 must be large enough for the fuel additive 20 to be removed from and replaced into the housing 12. The aperture 30 may also be opened for the purpose of venting the housing 12 of the fuel filter assembly 10 so that the fuel contained in the housing 12 will drain back into the system. It is necessary to vent the housing 12 when removing and/or replacing the fuel additive 20, when replacing the filter media 18 and when conducting any other maintenance associated with the fuel filter assembly 10. When such maintenance is completed, the aperture 30 may also be utilized as an access for priming the fuel filter assembly 10 by adding fuel directly into the housing 12 through the aperture 30. To close the aperture 30, the cap 92 is threaded into the aperture 30 and tightly secured to the top portion 22 of the housing 12 so that the housing 12 is closed, and the fuel filter assembly 10 is ready for use.

When the aperture 30 is opened to vent the housing 12, and the top portion 22 is removed from the bottom portion 24 of the housing 12, fuel may escape into the surrounding environment, and unfiltered, untreated fuel may escape through the fuel outlet 16 and into the engine. To prevent such occurrences, a well 106 is provided in the bottom portion 24 of the housing 12 and is defined by the wall 40, the floor 54, and the fuel outlet 16. The vertical level of the fuel outlet 16 is higher than the vertical height of the wall 40 to ensure that unfiltered, untreated fuel in the well 106 does not spill over into the fuel outlet 16.

When the fuel filter assembly 10 is in use, the top portion 22 of the housing 12 is secured and sealed to the bottom portion 24 of the housing 12, and the cap 92 is secured and sealed to the top portion 22 of the housing 12 to close the aperture 30 and provide a closure for the housing 12. The fuel filter assembly 10 receives fuel through the fuel inlet 14, and the fuel inlet 14 delivers the fuel into the housing 12 between the housing 12 and the filter media 18. The fuel level rises in the housing 12 only to a level that will satisfy flow demand with the lowest possible pressure differential across the filter media 18. This provides a filtering arrangement that utilizes only as much of the filter media 18 as necessary to achieve the least possible restriction of fuel flow through the filter media 18. As the fuel passes through the filter media 18, the fuel contacts the fuel additive 20 through the apertures 76 provided in the outer reinforcement 72. Since the fuel additive 20 is mounted in a vertical column with the filter media 18, the amount of fuel additive 20 exposed to the fuel is proportional to the amount of filter media 18 exposed to obtain the least possible restriction of fuel flow. Since the fuel additive 20 is soluble with the fuel, the fuel additive 20 slowly dissolves into the fuel and then passes through the fuel outlet 16. By having the release of fuel additive 20 correspond with the fuel level, the fuel additive 20 is time released to provide a continuing supply of fuel additive over the useful life of the filter media 18.

When the filter media 18 becomes obstructed and fuel flow demand is not met, the fuel level in the housing 12 will rise so that the fuel flow demand is satisfied by maintaining the lowest possible pressure differential across the filter media 18 while utilizing the least possible amount of filter media 18. In the case of the fuel additive 20 being a microbicide, the contaminants may be microbial growths, and therefore, when the fuel level rises, more fuel additive 20 is exposed to the fuel, thereby destroying the microbial growths and reducing the contaminants in the fuel.

Figure 3A:
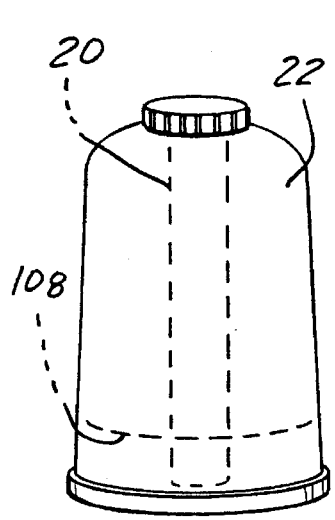
FIGS. 3A–C are schematic diagrams showing the progression of the fuel level and fuel additive level during different intervals of the useful life of the filter media and the fuel additive.
Figure 3B:
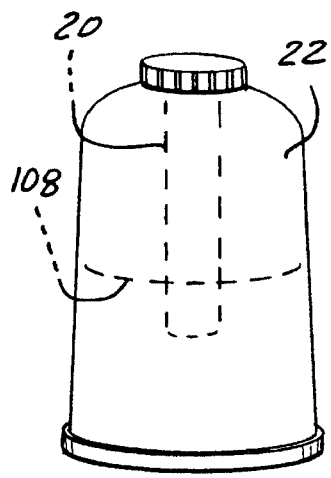
Figure 3C:
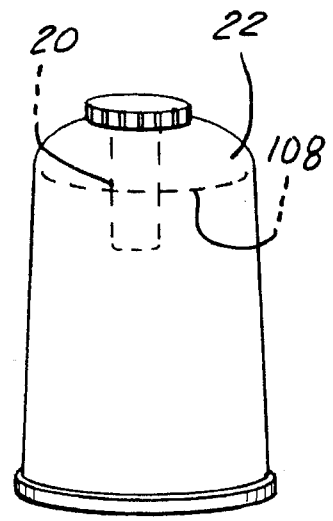

As the filter media 18 becomes increasingly obstructed, the fuel level continues to rise within the housing 12. By observing the fuel level through the transparent top portion 22 of the housing 12, a determination as to the useful life of the filter media 18 and the fuel additive 20 can be easily ascertained. As seen in FIG. 3A, when the fuel level 108 is near the bottom of the housing 12, the filter media 18 has its entire useful life available as the filter media 18 is unobstructed, and only a small portion of the fuel additive 20 has dissolved. As seen in FIG. 3B, when the fuel level 108 is midway up the housing 12, substantially half of the useful life of the filter media 18 remains. This corresponds to substantially half of the filter media 18 being obstructed while substantially half of the fuel additive 20 has dissolved. As seen in FIG. 3C, when the fuel level 108 is at the top of the housing 12, only a small amount of useful life remains in the filter media 18. The filter media 18 has become almost completely obstructed, and the fuel additive 20 may be completely dissolved. When the fuel level 108 is observed at the top of the housing 12, as seen in FIG. 3C, the filter media 18 and fuel additive 20 are replaced.

In order to avoid environmental and cost concerns when replacing and discarding the filter canister 62 and fuel additive 20, the fuel canister 62 and fuel additive 20 are entirely fabricated from combustible material. The filter canister 62 utilizes a paper filter media 18 and molded plastisol/epoxy end caps 64, 66. The fuel additive 20 is obviously combustible, and the wax substrate is fabricated from a paraffin which is a hydrocarbon mixture with clean burning characteristics. The outer reinforcement 72 of the fuel additive is fabricated from a paper based material or a molded plastisol/epoxy which are both combustible.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A fuel filter assembly for filtering and treating a fuel under pressure comprising:

means for filtering said fuel so that the lowest possible pressure differential is maintained across said filtering means while utilizing the least possible amount of said filtering means to meet the demands of fuel flow;

a fuel additive housed within said filtering means wherein said fuel additive is separately supported and independently removable from said filtering means and soluble in said fuel; and means for time releasing said fuel additive over the useful life of said filtering means.

2. A fuel filter assembly as stated in claim 1, wherein means for filtering comprises a hydrophobic filter media that prohibits the passage of water through said filter media.

3. A fuel filter assembly as stated in claim 1, wherein said fuel additive is selected from the group consisting of: microbiocides, cetane improvers, antioxidants, stabilizers, combustion improvers and emission reducers.

4. A fuel filter assembly as stated in claim 1, wherein said filtering means and said fuel additive are entirely fabricated from combustible materials.

5. A fuel filter assembly as stated in claim 1, wherein said means for time releasing said fuel additive includes means for proportionally exposing said additive and filter media to said fuel.

6. A fuel filter assembly for filtering and treating a volatile fuel under pressure comprising:

a housing having an interior and means for accessing said interior, and said housing having a fuel inlet and a fuel outlet;

means for filtering said fuel so that the lowest possible pressure differential is maintained across said filtering means while utilizing the least possible amount of said filtering means to meet the demands of fuel flow, and said filtering means housed in said housing;

said inlet of said housing delivering said fuel under pressure between said housing and said fuel filtering means for passage through said filtering means;

a fuel additive housed within said filtering means and soluble with said fuel;

means for supporting said fuel additive separate and independent from said filtering means allowing independent replacement of said fuel additive;

means for time releasing said fuel additive over the useful life of said filtering means; and said fuel outlet of said housing providing an exit for said fuel downstream from said filtering means and said fuel additive.

7. The fuel filter assembly as stated in claim 6, wherein a portion of said housing is fabricated from a transparent material so that the useful life of said filtering means and said fuel additive can be determined without having to disassemble said fuel filter assembly by viewing the fuel level in said housing.

8. A fuel filter assembly as stated in claim 6, wherein said filtering means comprises a hydrophobic filter media that prohibits the passage of water through said filter media.

9. A fuel filter assembly as stated in claim 6, wherein said fuel additive is selected from the group consisting of: microbiocides, cetane improvers, antioxidants, stabilizers, combustion improvers and emission producers.

10. A fuel filter assembly as stated in claim 6, wherein said filtering means, said fuel additive and said supporting means are entirely fabricated from combustible materials.

11. A fuel filter assembly as stated in claim 6, wherein said means for supporting said fuel additive includes a substrate fabricated from a fuel soluble material.

12. A fuel filter assembly for filtering and treating a volatile fuel under pressure comprising:
   a housing having a top portion and a bottom portion and having a fuel inlet and a fuel outlet;
   said top portion and said bottom portion having mating threaded regions so that said top portion threads onto said bottom portion to form a parting line between said top portion and said bottom portion;
   said top portion having an annular groove extending inward from said parting line;
   a deformable annular seal housed in and extending from said annular groove of said top portion, and said annular seal deforming against said bottom portion when said top portion is threaded onto said bottom portion;
   means for filtering said fuel so that the lowest possible pressure differential is maintained across said filtering means while utilizing the least possible amount of said filtering means to meet the demands of fuel flow, and said filtering means housed in said housing;
   said inlet of said housing delivering said fuel under pressure between said housing and said fuel filtering means for passage through said filtering means;
   a fuel additive housed within said filtering means and soluble with said fuel;
   means for supporting said fuel additive so that said fuel contacts and dissolves said fuel additive;
   means for time releasing said fuel additive over the useful life of said filtering means; and
   said fuel outlet of said housing providing an exit for said fuel downstream from said filtering means and said fuel additive.

13. A fuel filter assembly for filtering and treating a volatile fuel under pressure comprising:
   a housing having a top portion and a bottom portion and having a fuel inlet and a fuel outlet;
   means for releasingly and sealingly connecting said top portion to said bottom portion of said housing;
   means for filtering said fuel so that the lowest possible pressure differential is maintained across said filtering means while utilizing the least possible amount of said filtering means to meet the demands of fuel flow, and said filtering means housed in said housing;
   said inlet of said housing delivering said fuel under pressure between said housing and said fuel filtering means for passage through said filtering means;
   a fuel additive housed within said filtering means and soluble with said fuel;
   a wax substrate mixed with said fuel additive to form a hollow cylindrical geometry, and said fuel dissolving said wax substrate and releasing said fuel additive into said fuel and said wax substrate having a high melting point and a clean burning characteristic;
   means for time releasing said fuel additive over the useful life of said filtering means; and
   said fuel outlet of said housing providing an exit for said fuel downstream from said filtering means and said fuel additive.

14. A fuel filter assembly as stated in claim 13, including an outer reinforcement extending around the periphery of said fuel additive, and said outer reinforcement having a plurality of apertures for allowing said fuel to directly contact said fuel additive, and said outer reinforcement retaining said fuel additive in a stationary position when portions of said fuel additive dissolve.

15. A fuel filter assembly for filtering and treating a volatile fuel under pressure comprising:
   a housing having a top portion and a bottom portion and having a fuel inlet and a fuel outlet;
   means for releasingly and sealingly connecting said top portion to said bottom portion of said housing;
   means for filtering said fuel so that the lowest possible pressure differential is maintained across said filtering means while utilizing the least possible amount of said filtering means to meet the demands of fuel flow, and said filtering means housed in said housing;
   said inlet of said housing delivering said fuel under pressure between said housing and said fuel filtering means for passage through said filtering means;
   a fuel additive housed within said filtering means and soluble with said fuel;
   means for supporting said fuel additive so that said fuel contacts and dissolves said fuel additive;
   said filtering means and said fuel additive extending vertically upward in a coaxial relationship wherein as said filtering means becomes obstructed from contaminants in said fuel, said fuel rises vertically in said housing to provide the lowest possible pressure differential across said filtering means in order to meet fuel flow demand by having said fuel rise vertically toward unobstructed portions of said filtering means and undissolved portions of said fuel additive so that the amount of said fuel additive exposed to said fuel is proportional to the amount of said filtering means exposed to said fuel; and
   said fuel outlet of said housing providing an exit for said fuel downstream from said filtering means and said fuel additive.

16. A fuel filter assembly for filtering and treating a volatile fuel under pressure comprising:
   a housing having a top portion and a bottom portion and having a fuel inlet and a fuel outlet;
   means for accessing said fuel additive wherein said top portion of said housing has an aperture extending therethrough for removing and replacing said fuel additive, for providing venting of said housing for draining said fuel from said housing, and for providing priming of said fuel filter assembly by introducing said fuel directly into said housing; and means for detachably and sealingly closing said aperture to provide a closure for said housing when said fuel filter assembly is in use;

means for releasingly and sealingly connecting said top portion to said bottom portion of said housing;

means for filtering said fuel so that the lowest possible pressure differential is maintained across said filtering means while utilizing the least possible amount of said filtering means to meet the demands of fuel flow, and said filtering means housed in said housing;

said inlet of said housing delivering said fuel under pressure between said housing and said fuel filtering means for passage through said filtering means;

a fuel additive housed within said filtering means and soluble with said fuel;

means for supporting said fuel additive so that said fuel contacts and dissolves said fuel additive;

means for time releasing said fuel additive over the useful life of said filtering means; and said fuel outlet of said housing providing an exit for said fuel downstream from said filtering means and said fuel additive.

17. A fuel filter assembly for filtering and treating a volatile fuel under pressure comprising:

a housing having a top portion and a bottom portion and having a fuel inlet and a fuel outlet, said bottom portion of said housing having a floor extending in a substantially horizontal plane and having said inlet extending therethrough, a wall integral with and extending vertically upward from said floor of said bottom portion of said housing, and said wall rising vertically to a level below said outlet, and a well defined by said wall, said outlet, and said floor of said bottom portion for collecting and holding excess fuel when said housing is vented so that said excess fuel does not escape outside said housing or through said outlet without passing through said filtering means and contacting said fuel additive;

means for releasingly and sealingly connecting said top portion to said bottom portion of said housing;

means for filtering said fuel so that the lowest possible pressure differential is maintained across said filtering means while utilizing the least possible amount of said filtering means to meet the demands of fuel flow, and said filtering means housed in said housing;

said inlet of said housing delivering said fuel under pressure between said housing and said fuel filtering means for passage through said filtering means;

a fuel additive housed within said filtering means and soluble with said fuel;

means for supporting said fuel additive so that said fuel contacts and dissolves said fuel additive;

means for time releasing said fuel additive over the useful life of said filtering means; and said fuel outlet of said housing providing an exit for said fuel downstream from said filtering means and said fuel additive.

18. A fuel filter assembly for filtering and treating a volatile fuel under pressure comprising:

a closed cylindrical housing extending vertically upward, and said housing having a top portion and a bottom portion;

said bottom portion of said housing having a substantially horizontal floor with a wall integral with and extending vertically upward from said floor, and said bottom portion having a fuel outlet comprising a hollow cylindrical tube extending vertically upward from said floor and rising to a vertical level above said wall, and said fuel outlet having a shoulder extending outward above said floor;

said top portion being transparent and having an one open-ended hollow cylindrical geometry;

said top portion and said bottom portion having mating threaded regions so that said top portion threads onto said bottom portion to form a parting line between adjoining surfaces of said top portion and of said bottom portion;

means for sealing said adjoining surfaces of said top portion and of said bottom portion along said parting line;

a fuel filter canister having a hydrophobic filter media folded back and forth and encircled to form a hollow cylinder and having a bottom and a top end cap supporting said filter media at its ends, and said end caps having apertures therethrough, and said fuel filter canister housed vertically upright within said housing and seated on said shoulder of said fuel outlet in said bottom portion of said housing;

a horizontal sub-floor mounted above and substantially parallel to said floor and below said bottom end cap of said fuel canister and having a plurality of apertures therethrough for delivering said fuel under pressure between said housing and said fuel filtering means for passage through said filtering means;

a fuel reservoir defined by the space between said floor and said sub-floor so that said fuel is evenly distributed from said fuel inlet and through said apertures of said sub-floor into said housing;

a fuel additive being fuel soluble and having a paraffin substrate mixed with said fuel additive to support and maintain said fuel additive in a hollow cylindrical geometry, and said fuel additive having an outer reinforcement with a plurality of apertures extending therethrough so that said fuel contacts said fuel additive through said apertures upon said fuel passing through said filter media;

said fuel additive being housed within said fuel filter canister, and said fuel additive having a bottom portion in communication with said outlet tube and said fuel additive having a bottom surface that abuts said shoulder of said fuel outlet;

said fuel additive time releasing into said fuel by said fuel rising vertically in said housing upon said fuel filter becoming obstructed in order to provide the least possible differential pressure loss across said filter media to meet fuel flow demand to said outlet by said fuel rising vertically toward unobstructed portions of said filtering means and toward undissolved portions of said fuel additive so that the amount of said fuel additive exposed to said fuel is proportional to the amount of said filtering means exposed to said fuel;

said top portion of said housing having a threaded aperture to provide access to said housing;

a cap having a head and a threaded neck portion for detachably closing said aperture in said top portion in order to form a closure in said housing for when said fuel filter assembly is in use and for opening said aperture for removing and replacing said fuel additive, venting said housing for draining said fuel from said housing and priming said fuel filter by introducing fuel directly into said housing through said aperture;

second means for sealing said head of said cap to said top portion of said housing;

an axial compression spring in said housing and seated between said top portion of said housing and said top end cap of said fuel filter so that said fuel filter remains seated on said shoulder of said fuel outlet;

a well in said bottom portion of said housing defined by said wall, said floor and said outlet, and said well collecting and holding excess fuel upon said housing being vented so that said fuel does not escape said housing and exit said outlet unfiltered and untreated.

19. A fuel filter assembly as claimed in claim 18, wherein said fuel additive is selected from the group consisting of: microbiocides, cetane improvers, antioxidants, stabilizers, combustion improvers and emission reducers.

20. A fuel filter as stated in claim 18 wherein said filter media, said end caps, said fuel additive, said paraffin substrate and said outer reinforcement are entirely fabricated from combustible materials.

* * * * *